United States Patent
Suk et al.

(10) Patent No.: US 9,175,982 B2
(45) Date of Patent: Nov. 3, 2015

(54) HALL SENSOR SIGNAL GENERATING DEVICE

(75) Inventors: Jung Hee Suk, Daejeon (KR); Yil Suk Yang, Daejeon (KR); Tae Moon Roh, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 48 days.

(21) Appl. No.: 13/586,699

(22) Filed: Aug. 15, 2012

(65) Prior Publication Data

US 2013/0154527 A1 Jun. 20, 2013

(30) Foreign Application Priority Data

Dec. 15, 2011 (KR) ........................ 10-2011-0135211

(51) Int. Cl.
*H02P 6/06* (2006.01)
*G01D 5/14* (2006.01)
*H02P 6/16* (2006.01)

(52) U.S. Cl.
CPC ................ *G01D 5/145* (2013.01); *H02P 6/165* (2013.01)

(58) Field of Classification Search
USPC .......... 318/400.06, 400.38, 595, 690, 41, 85, 318/705
See application file for complete search history.

(56) References Cited

U.S. PATENT DOCUMENTS

| 6,181,093 B1 | 1/2001 | Park et al. |
| 2010/0265211 A1* | 10/2010 | Oishi et al. ..................... 345/174 |
| 2011/0031906 A1* | 2/2011 | Yasohara et al. ................. 318/66 |
| 2013/0099706 A1* | 4/2013 | Ng ........................... 318/400.23 |

FOREIGN PATENT DOCUMENTS

| KR | 1019980082392 B1 | 12/1998 |
| KR | 1020000014512 A | 3/2000 |
| KR | 1020090056112 A | 6/2009 |
| KR | 1020100013730 A | 2/2010 |

* cited by examiner

*Primary Examiner* — Eduardo Colon Santana
*Assistant Examiner* — Iftekhar Mustafa

(57) ABSTRACT

Disclosed is a hall sensor signal generating device which includes a rotor which has a magnetic property and rotates on the basis of a rotary axis; a hall sensor unit which is disposed to be spaced apart from a stator disposed outside the rotor; and a clock synchronization unit which receives a driving clock, performs synchronization between the driving clock and a hall sensor signal output from the hall sensor unit, and outputs the synchronized driving clock and the synchronized hall sensor signal.

7 Claims, 5 Drawing Sheets

HALL SENSOR SIGNAL GENERATING DEVICE

CROSS-REFERENCE TO RELATED APPLICATIONS

A claim for priority under 35 U.S.C. §119 is made to Korean Patent Application No. 10-2011-0135211 filed Dec. 15, 2011, in the Korean Intellectual Property Office, the entire contents of which are hereby incorporated by reference.

BACKGROUND

The inventive concepts described herein relate to a home sensor signal generating device.

Measurement of rotating angle and speed of a rotor may be needed to control a speed of a motor, in particular, a brushless motor. The rotating angle and speed of the rotor may be measured by an encoder rotated with the rotor or a hall sensor disposed at a stator.

A hall sensor may be a magnetic sensor the output of which is varied according to an applied magnetic field. A magnetic field applied to the hall sensor may be varied according to rotation of a magnetic pole for location detection disposed at the rotor. The rotating angle and speed of the rotor may be measured by measuring an output signal of the hall sensor disposed at the stator. The hall sensor may be disposed at the stator with a predetermined interval, and may generate a multiplied pulse signal. It may be necessary to reduce a difference between an output signal of the hall sensor and an internal signal of a motor controller for precise control of a motor speed.

SUMMARY

One aspect of embodiments of the inventive concept is directed to provide a hall sensor signal generating device comprising a rotor which has a magnetic property and rotates on the basis of a rotary axis; a hall sensor unit which is disposed to be spaced apart from a stator disposed outside the rotor; and a clock synchronization unit which receives a driving clock, performs synchronization between the driving clock and a hall sensor signal output from the hall sensor unit, and outputs the synchronized driving clock and the synchronized hall sensor signal.

In example embodiments, the hall sensor signal generating device is included in a Brushless Direct Current (BLDC) motor.

In example embodiments, the hall sensor signal generating device is included in a Synchronous Reluctance Motor (SynRM).

In example embodiments, the hall sensor unit includes a plurality of hall sensors that are disposed with the same interval.

In example embodiments, the plurality of hall sensors includes three hall sensors that are disposed with an interval of 120 degrees.

In example embodiments, the hall sensor signal generating device further comprises a clock generating unit which generates an internal driving clock; and a clock controlling unit which receives an external driving clock and a control signal from an external device, selects one of the external driving clock and the internal driving clock according to the control signal, and provides the selected driving clock to the clock synchronization unit.

In example embodiments, a frequency of the internal driving clock is variable.

In example embodiments, the clock controlling unit further includes a multiplier for multiplying a frequency of the selected driving clock.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
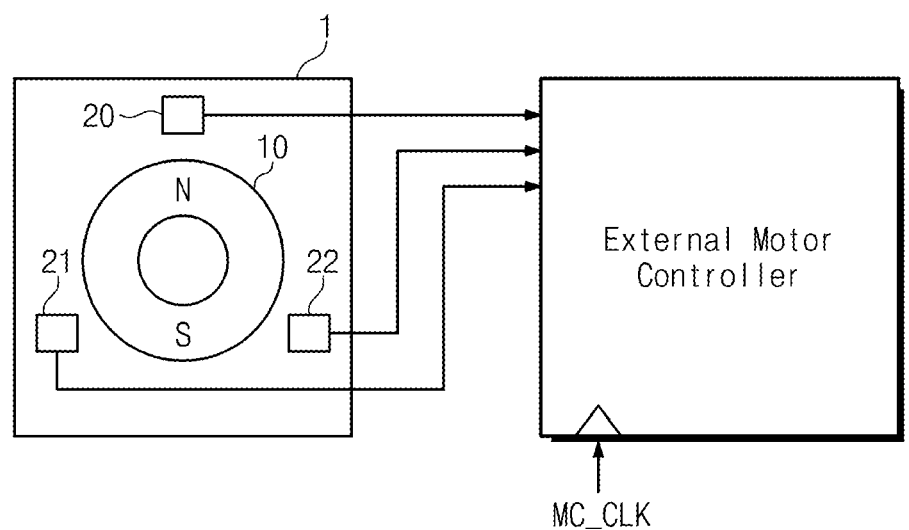
FIG. 1 is a block diagram schematically illustrating a connection structure between a hall sensor signal generating device and an external motor controller according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a connection structure between a hall sensor signal generating device and an external motor controller according to an embodiment of the inventive concept. Referring to FIG. 1, a hall sensor signal generating device 1 may include a rotor 10, a first hall sensor 20, a second hall sensor 21, and a third hall sensor 22. In FIG. 1, there is exemplarily illustrated the case that a hall sensor signal generating device includes three hall sensors. However, the inventive concept is not limited thereto. The inventive concept may be applied to all hall sensor signal generating devices each having one or more hall sensors.

The hall sensor signal generating device 1 may generate a hall sensor signal to output it to an external device, for example, the external motor controller. The hall sensor signal generating device 1 may include a Brushless Direct Current (BLDC) motor or a Synchronous Reluctance Motor (SynRM).

The rotor 10 may form a magnetic field through joining of magnets. Magnets of the rotor 10 may be a ring permanent magnet. The rotor 10 may be rotated according to a direction of current applied to a stator of a motor. The rotor 10 may continue to be rotated as a direction of current is periodically varied by a control circuit.

The rotor 10 may have a magnetic property, and a magnetic field applied to a stator of a motor may be varied by rotation of the rotor 10. A location of the rotor 10, that is, a rotating angle and a speed may be measured by measuring a varied magnetic field.

The first to third hall sensors 20 to 22 may be disposed at the stator of the motor with the same interval. In example embodiments, three hall sensors may be disposed with an interval of 120 degrees. If a magnetic field is applied to a hall sensor in a vertical direction, an electric potential perpendicular to a direction of the magnetic field may be generated. As the rotor 10 rotates, each of the first to third hall sensors 20 to 22 may output a square wave pulse signal having a phase difference of 60 degrees.

Output hall sensor signals S1, S2, and S3 output from the first to third hall sensors 20 to 22 may be provided to the external motor controller. The external motor controller may measure the rotating angle and speed of the rotor 10 using input hall sensor signals S1', S2', and S3' to control a current input to a motor. The external motor controller may be formed of a digital circuit, and may operate in synchronization with a driving clock MC_CLK. A synchronization error among the input hall sensor signals S1', S2', and S3' measured within the external motor controller may be generated when the output hall sensor signals S1, S2, and S3 input from the first to third hall sensors 20 to 22 are not synchronized with the driving clock MC_CLK of the external motor controller.

Figure 2:
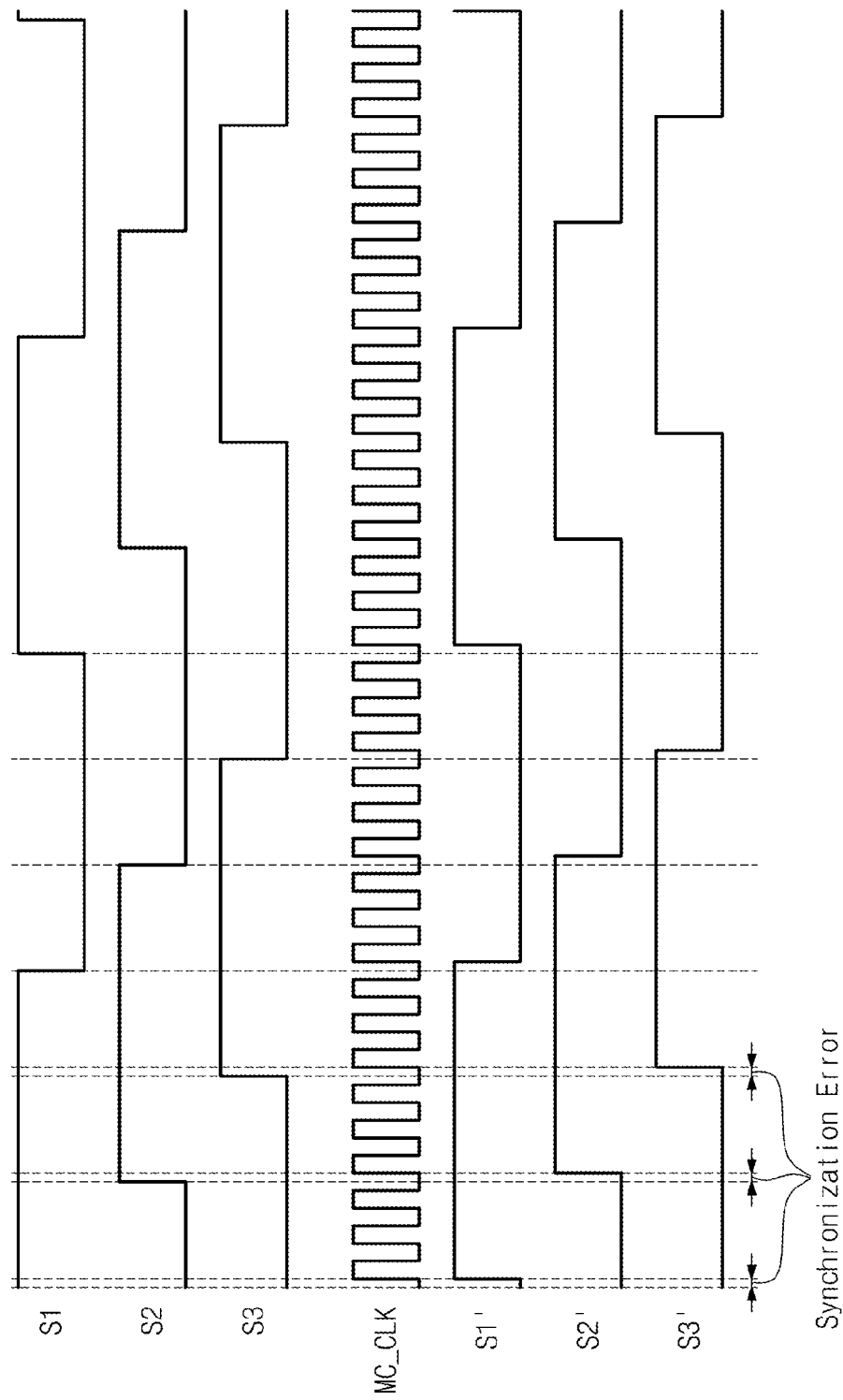
FIG. 2 is a timing diagram illustrating output hall sensor signals of a hall sensor signal generating device, input hall sensor signals measured within an external motor controller, and a driving clock of the external motor controller.

FIG. 2 is a timing diagram illustrating output hall sensor signals of a hall sensor signal generating device, input hall sensor signals measured within an external motor controller, and a driving clock of the external motor controller.

Referring to FIG. 2, output hall sensor signals S1, S2, and S3 may be square wave pulse signals, having a phase difference of 60 degrees, output from first to third hall sensors 20 to 22. Input hall sensor signals S1', S2', and S3' may be the output hall sensor signals S1, S2, and S3 which are input within the external motor controller.

Within the external clock, the output hall sensor signals S1, S2, and S3 may appear in synchronization with the driving clock MC_CLK. Thus, if the output hall sensor signals S1, S2, and S3 are not synchronized with the driving clock MC_CLK of the external motor controller, a synchronization error may be generated among the input hall sensor signals S1', S2', and S3'.

With the above description, the rotating angle and speed measured at the external motor controller may have an error due to synchronization. Thus, it is difficult to control a speed precisely due to an error generated at a motor speed controlling operation.

Figure 3:
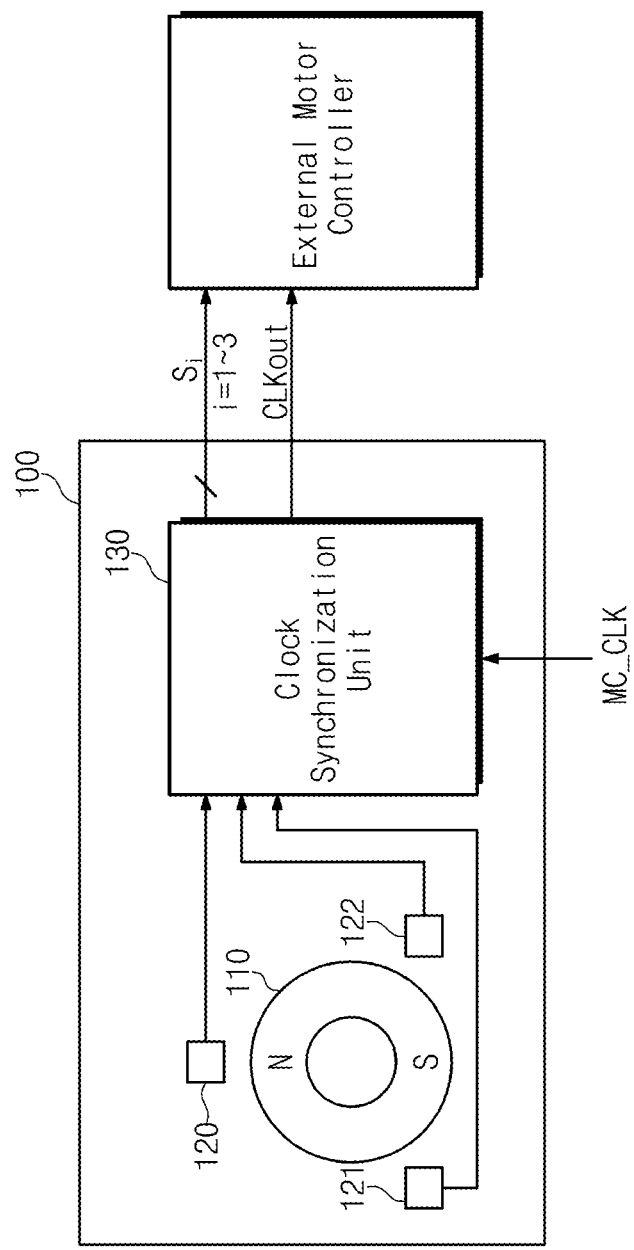
FIG. 3 is a block diagram schematically illustrating a connection structure between a hall sensor signal generating device and an external motor controller according to another embodiment of the inventive concept.

FIG. 3 is a block diagram schematically illustrating a connection structure between a hall sensor signal generating device and an external motor controller according to another embodiment of the inventive concept. Referring to FIG. 3, a hall sensor signal generating device 100 may include a rotor 110, a first hall sensor 120, a second hall sensor 121, a third hall sensor 122, and a clock synchronization unit 130.

The first to third hall sensors 120 to 122 in FIG. 3 may be configured the same as those in FIG. 1. A magnetic field applied to a stator may be varied by rotation of the rotor 110. The first to third hall sensors 120 to 122 may output square wave output signals having a phase difference of 60 degrees. Output hall sensor signals may be sent to the clock synchronization unit 130.

The clock synchronization unit 130 may receive a driving clock MC_CLK from an external device. The clock synchronization unit 130 may perform synchronization between the driving clock MC_CLK and the output hall sensor signals. The clock synchronization unit 130 may output synchronized output hall sensor signals S1, S2, and S3 and a driving clock CLKout.

The external motor controller may receive the synchronized output hall sensor signals S1, S2, and S3. The external motor controller may receive the driving clock CLKout synchronized with the output hall sensor signals as a driving clock. Since the output hall sensor signals S1, S2, and S3 input from the first to third hall sensors 120 to 122 are synchronized with the driving clock CLKout, no synchronization error may be generated.

The hall sensor signal generating device 100 may output a hall sensor signal and a driving clock synchronized with the hall sensor signal. The external motor controller may use a driving clock output from the hall sensor signal generating device 100 as a driving clock of a digital circuit. Thus, a synchronization error may not be generated when the external motor controller receives a hall sensor signal.

Figure 4:
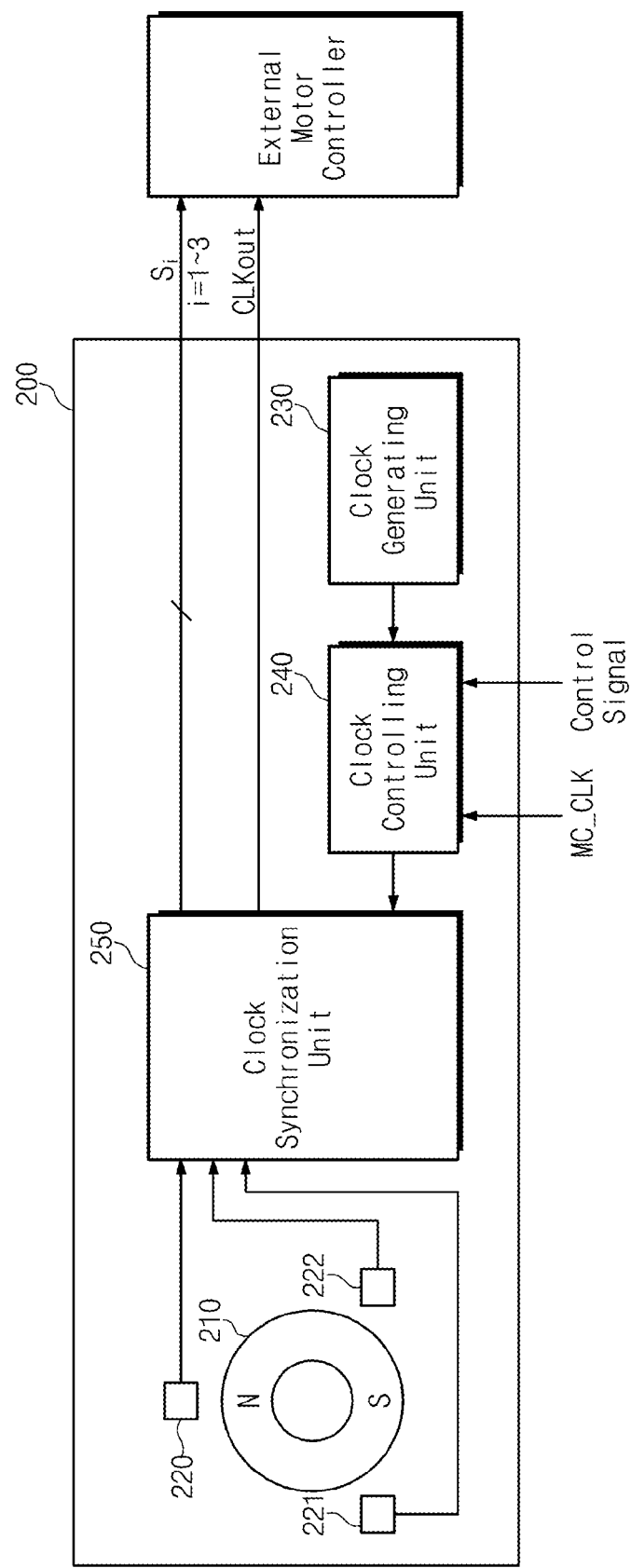
FIG. 4 is a block diagram schematically illustrating a connection structure between a hall sensor signal generating device and an external motor controller according to still another embodiment of the inventive concept.

FIG. 4 is a block diagram schematically illustrating a connection structure between a hall sensor signal generating device and an external motor controller according to still another embodiment of the inventive concept. Referring to FIG. 4, a hall sensor signal generating device 200 may include a rotor 210, a first hall sensor 220, a second hall sensor 221, a second hall sensor 222, a clock generating unit 230, a clock controlling unit 240, and a clock synchronization unit 250.

The first to third hall sensors 220 to 222 in FIG. 4 may be configured the same as those in FIG. 3. A magnetic field applied to a stator may be varied by rotation of the rotor 210. The first to third hall sensors 220 to 222 may output square wave output signals having a phase difference of 60 degrees. Output hall sensor signals may be sent to the clock synchronization unit 250.

The clock generating unit 230 may generate an internal driving clock. A frequency of the internal driving clock generated by the clock generating unit 230 may be variable. The clock generating unit 230 may provide the internal driving clock to the clock controlling unit 240.

The clock controlling unit 240 may receive the internal driving clock from the clock generating unit 230. The clock controlling unit 240 may receive an external driving clock MC_CLK and a control signal from an external device. Whether a driving clock to be used for synchronization is the internal clock signal or the external clock signal may be determined according to the control signal.

The clock controlling unit 240 may include a multiplier. The multiplier may multiply a selected driving clock to adjust a frequency of a driving clock. The clock controlling unit 240 may provide the clock synchronization unit 250 with the selected driving clock (or, in the event that a multiplier is used, a driving clock the frequency of which is adjusted through the multiplier).

The clock synchronization unit 250 may perform synchronization between the input driving clock and an output hall sensor signal. The clock synchronization unit 250 may output synchronized output hall sensor signals S1, S2, and S3 and a driving clock CLKout.

Since the control signal and the external driving clock provided to the hall sensor signal generating device 200 are square wave pulse signals, an input interface of the hall sensor signal generating device 200 may be a digital interface. Also, since the output hall sensor signal and the driving clock output from the hall sensor signal generating device 200 are square wave pulse signals, an output interface of the hall sensor signal generating device 200 may be a digital interface.

The external motor controller may receive the synchronized output hall sensor signals S1, S2, and S3. Also, the external motor controller may receive the driving clock synchronized with the output hall sensor signal as a driving clock. Since the output hall sensor signals S1, S2, and S3 input from the first to third hall sensors 220 to 222 are synchronized with the driving clock CLKout, no synchronization error may be generated.

As described above, the hall sensor signal generating device 200 may output a hall sensor signal and a driving signal synchronized with the hall sensor signal. The driving clock can be an internally generated driving clock or a feedback signal of an externally provided driving clock. The external motor controller may use a driving clock output from the hall sensor signal generating device 200 as a driving clock of a digital circuit. Thus, a synchronization error may not be generated when the external motor controller receives a hall sensor signal.

Figure 5:
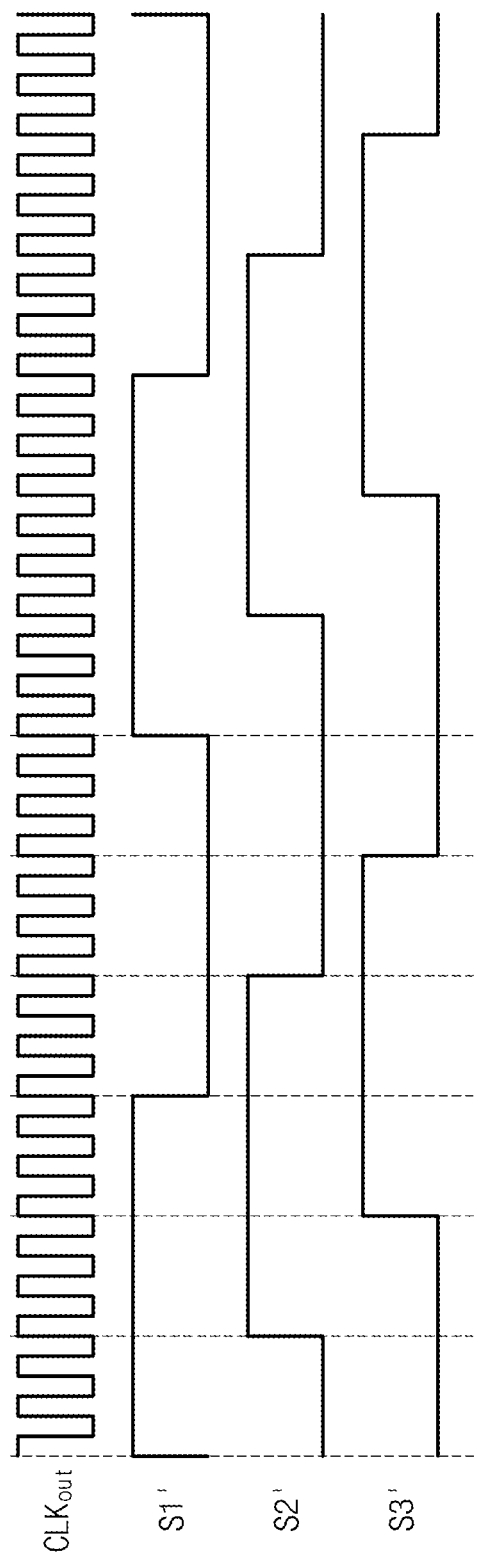
FIG. 5 is a timing diagram illustrating synchronized output hall sensor signals of a hall sensor signal generating device in FIG. 4, input hall sensor signals measured within an external motor controller, and a driving clock of the external motor controller.

FIG. 5 is a timing diagram illustrating synchronized output hall sensor signals of a hall sensor signal generating device in FIG. 4, input hall sensor signals measured within an external motor controller, and a driving clock of the external motor controller.

Referring to FIG. 5, synchronized output hall sensor signals may be square wave pulse signals that are synchronized after output from first to third hall sensors 220 to 223 and have a phase difference of 60 degrees. Input hall sensor signals S1', S2', and S3' may be the synchronized output hall sensor signals that are provided within an external motor controller.

Within the external clock, the synchronized output hall sensor signals may appear in synchronization with a driving clock of the external motor controller.

Referring to a hall sensor signal generating device in FIG. 1, an output hall sensor signal may be synchronized with a driving clock of the external motor controller. Unlike the hall sensor signal generating device in FIG. 1, if a hall sensor signal generating device in FIG. 4 is used, no synchronization error may be generated among input hall sensor signals S1', S2', and S3' measured within the external motor controller.

It is possible to control a motor speed more precisely by removing a synchronization error caused when the external motor controller measures rotating angle and speed of a rotor.

The inventive concept may be modified or changed variously. For example, a rotor, a hall sensor, a clock generating unit, a clock controlling unit, and a clock synchronization unit may be changed or modified variously according to environment and use.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A Hall sensor signal generating device comprising:
a rotor which has a magnetic property and is configured to rotate on a rotary axis;
a Hall sensor unit which is disposed on a stator and outside the rotor and configured to output a Hall sensor signal;
a clock generating unit disposed within the Hall sensor signal generating device and configured to generate an internal driving clock signal; a clock controlling unit configured to receive the internal driving clock signal, an external driving clock signal, and a control signal, the external driving clock signal and the control signal generated from an external device located outside the Hall sensor signal generating device, to select either the external driving clock signal or the internal driving clock signal as a selected driving clock signal according to the control signal, and to provide the selected driving clock signal to a clock synchronization unit;

and the clock synchronization unit configured to receive the selected driving clock signal and the Hall sensor signal, to perform synchronization between the selected driving clock signal and the Hall sensor signal, and to output a synchronized driving clock signal and a synchronized Hall sensor signal and, wherein a rising edge of the synchronized driving clock signal corresponds to a rising edge of the synchronized Hall sensor signal or a falling edge of the synchronized Hall sensor signal.

2. The Hall sensor signal generating device of claim 1, wherein the Hall sensor signal generating device is included in a Brushless Direct Current (BLDC) motor.

3. The Hall sensor signal generating device of claim 1, wherein the Hall sensor signal generating device is included in a Synchronous Reluctance Motor (SynRM).

4. The Hall sensor signal generating device of claim 1, wherein the Hall sensor unit includes a plurality of Hall sensors that are disposed with the same interval.

5. The Hall sensor signal generating device of claim 4, wherein the plurality of Hall sensors includes three Hall sensors that are disposed with an interval of 120 degrees.

6. The Hall sensor signal generating device of claim 1, wherein a frequency of the internal driving clock signal is variable.

7. The Hall sensor signal generating device of claim 1, wherein the clock controlling unit further includes a multiplier configured to multiply a frequency of the selected driving clock signal to adjust the frequency of the selected driving clock signal.

* * * * *